Figure 1:
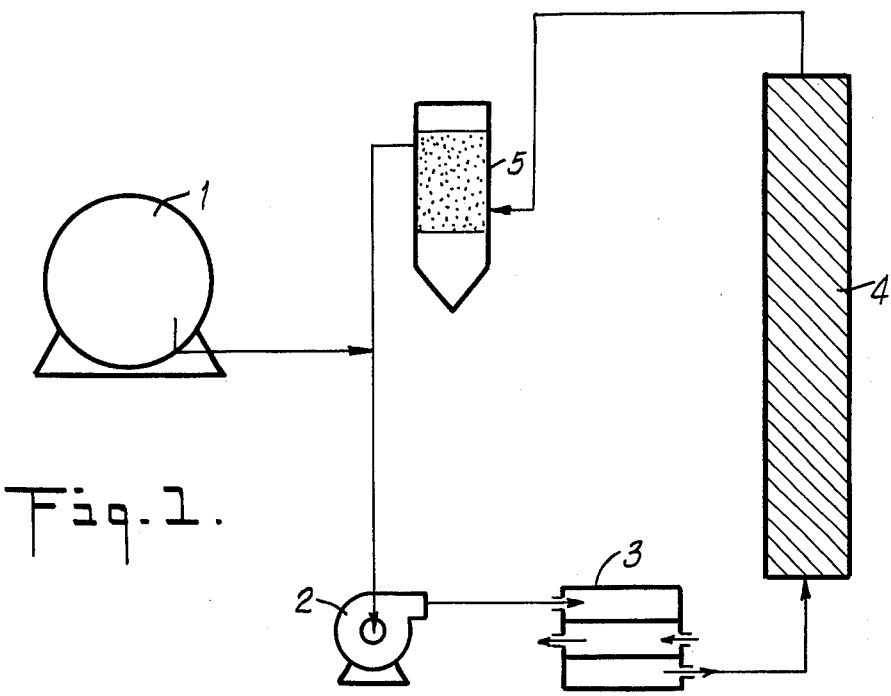

United States Patent
Vitzthum et al.

[11] 3,879,569
[45] Apr. 22, 1975

[54] PROCESS FOR THE DECAFFEINATION OF RAW COFFEE

[75] Inventors: Otto Vitzthum, Bremen; Peter Hubert, Bremen-Lesum, both of Germany

[73] Assignee: HAG Aktiengesellschaft, Bremen, Germany

[22] Filed: Mar. 12, 1973

[21] Appl. No.: 340,187

[30] Foreign Application Priority Data
Mar. 14, 1972 Germany .............................. 2212281

[52] U.S. Cl. .................. 426/427; 260/256; 426/428
[51] Int. Cl. ............................................... A23f 1/10
[58] Field of Search ............................. 426/427, 428

[56] References Cited
FOREIGN PATENTS OR APPLICATIONS
2,005,293  11/1971  Germany ........................... 426/428

OTHER PUBLICATIONS
"Sugar, Cocoa, Coffee, Tea, Spice, Leaven" by Winton, Published by John Wiley and Sons 1939, pages 148–149.

*Primary Examiner*—Frank W. Lutter
*Assistant Examiner*—Neil F. Greenblum

[57] ABSTRACT

Raw coffee moistened to a water content of about 10 to 60% by weight is extracted with aqueous liquid carbon dioxide at a pressure above the critical pressure to extract caffein values therefrom. The caffein may be separately recovered.

8 Claims, 2 Drawing Figures

PROCESS FOR THE DECAFFEINATION OF RAW COFFEE

BACKGROUND OF THE INVENTION

This invention relates to a process for the decaffeination of raw coffee.

In the past decades an increased number of processes have been developed for removing caffein values from raw coffee. Most of these processes depend upon the extraction of raw coffee which has been expanded by treatment with water or steam. A variety of solvents have been utilized for the selective extraction of the alkaloid. Solvents which have been suggested for use include esters, aromatic hydrocarbons, and halogenated hydrocarbons. The solvents have been used singly or in mixtures. The aqueous raw coffee or even roasted coffee have been extracted in countercurrent apparatus, for example with trichloroethylene. The aqueous phase, free from caffein, has been returned to the coffee beans in a closed circuit.

A principal deficiency of these processes has been the necessity of removing the solvent medium from the beans at elevated temperatures. Often this is carried out by steam distillation with pressurized steam immediately following the removal of the caffein. This process has required relatively complicated equipment and process techniques which have markedly increased the cost. Accordingly, the art has long sought improved techniques for the removal of caffein.

U.S. Pat. No. 1,640,648 describes a process by which the caffein is removed by sublimation at 178°C. Prior to sublimation the raw coffee is treated with alkali to liberate the caffein. Subsequent to such treatment the coffee is traversed with an inert gas such as hydrogen, nitrogen or carbon dioxide at elevated temperature. The caffein is removed in the gas stream. The coffee thus produced cannot, however, be regarded as caffein free because the coffee as produced still contains 0.35% caffein. Another serious problem with the process is that it is necessary to treat the coffee with alkalies and also at extremely high temperatures.

A process has recently been described in German Pat. No. 2,005,293 in which caffein is removed from moist raw coffee utilizing supercritical gaseous carbon dioxide. The described temperature range is from 40° to 80°C, the lower limit being the critical temperature of carbon dioxide. However, the processing of raw coffee in this temperature range has led to the production of roasted coffee not fully satisfactory as to taste.

Caffein has also been removed from raw coffee with liquid carbon dioxide at temperatures below the critical temperature. Decaffeination of raw coffee is also possible with a two phase mixture of liquid and gaseous carbon dioxide at the equilibrium pressure and also in single phase with liquid carbon dioxide — i.e. somewhat above the equilibrium pressure of carbon dioxide and its solutions at the relevant temperature. However, the extraction is not particularly selective in that the aroma constituents of the coffee are extracted along with the caffein. The process of the above mentioned German Pat. No. 2,005,293 is also subject to this drawback.

The properties of liquid carbon dioxide, particularly for obtaining coffee aroma oils, has been described in various literature articles and patents of which the following are examples:

S. M. Sivetz, *Coffee Processing Technology*, Vol. 2, p. 21 – 3.

British Pat. No. 1,106,468
Austrian Pat. No. 285,307
Food Technology 23, 11, 50 (1969)

From the foregoing it has been ascertained that with the extraction of caffein from raw coffee utilizing liquid carbon dioxide, a large number of other materials are concurrently extracted. The caffein therefore is obtained in a very impure form, and constituents which would preferably remain in the coffee to impart desirable odor characteristics are removed.

THE INVENTION

It has now, surprisingly, been discovered that raw coffee with a moisture content of from about 10 to 60 percent by weight can be selectively extracted with liquid carbon dioxide at a pressure above the critical pressure to remove caffein values in a practically pure state without affecting the aroma content of the coffee.

The caffein recovered by the process of this invention is a white powder with a purity of more than 98%. This degree of purity has not hitherto been attainable. It should be noted, experience and study of the previously known processes provide no basis for predicting the valuable selectivity of liquid carbon dioxide at pressures above the critical pressure.

A particular advantage of the process is that it is carried out at a low temperature, suitably from about 0°C to the critical temperature of carbon dioxide (about 31.4°C). The pressure can vary over a relatively wide range above the critical pressure. In fact there is no theoretical upper limit. For convenience, however, and to minimize costs of equipment without sacrificing efficiency, it is preferred to operate at pressures of from about 80 to 400 atmospheres.

In the presently preferred method of practicing the process of this invention, the liquid carbon dioxide contains water.

In FIG. 1 there is outlined one particularly advantageous embodiment of this invention. In the process carbon dioxide from tank 1 is pumped through pump 2 and heat exchanger 3 into extraction column 4. The column contains raw coffee which has been previously moistened with water to expand the beans. The carbon dioxide laden with the extracted caffein then passes through adsorption column containing activated carbon, charcoal or other suitable adsorbent. If carbon is utilized, it is previously wetted with water. The caffein is adsorbed and may be separately recovered. The carbon dioxide, substantially free of caffein, but wet with water, returns to pump 2 to be recycled. For this operation typical operating conditions could be temperature, 20°C; pressure, 80 atmospheres gauge; water content of raw coffee, 50% by weight; and the charcoal, fully saturated with water.

It is also possible to carry out the process with coffee having a water content less than 60%, but in this case the proportion of water in the sorption layer must be reduced to a corresponding degree. The process should generally be managed so that water is neither supplied to nor withdrawn from either the moist raw coffee charge or the adsorber charge by the solvent, because otherwise additional losses of extract (apart from caffein) in the coffee occur which would prejudice the success of the method, because the extract content of coffee is one of the factors determining its value.

Figure 2:
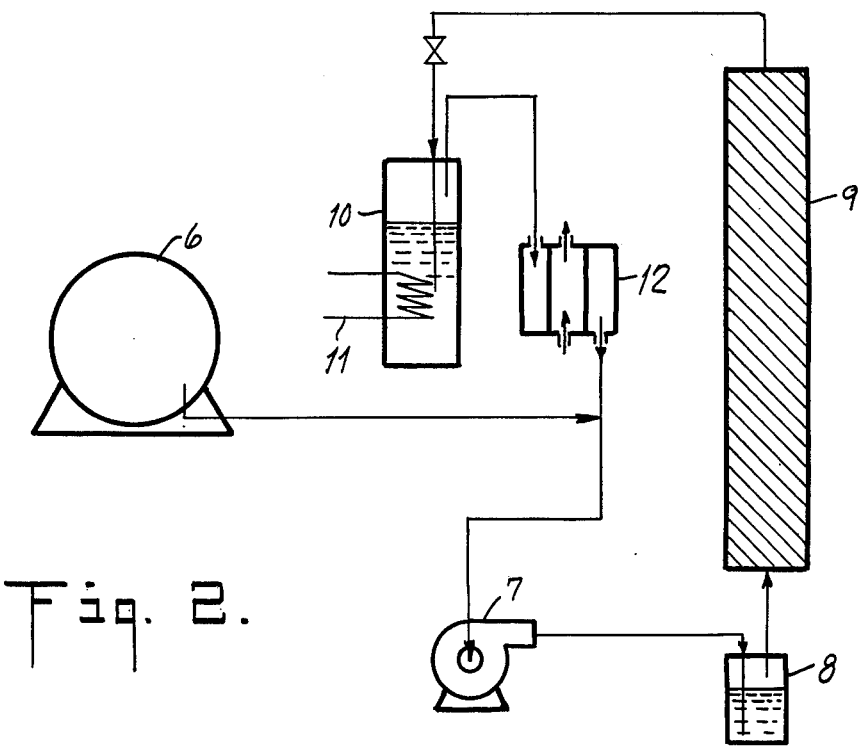

FIG. 2 illustrates a second embodiment of the process of this invention. In this process the caffein is separated from the liquid carbon dioxide stream by vaporizing it, thus causing the caffein to precipitate. The gas A, whereas column B includes the comparative values for untreated final product):

|  | Caffein Content | | Water soluble Substances | | Moisture | |
| --- | --- | --- | --- | --- | --- | --- |
|  | A | B | A | B | A | B |
| Raw Coffee | 0.05% | 0.99% | 23.5% | 24.6% | 11% | 10.2% |
| Roasted Coffee | 0.06% | 1.04% | 25% | 26.2% | <1% | <1% | is then recondensed and returned to the cycle. According to this embodiment, carbon dioxide from tank 6 is conveyed through pump 7 through water container 8 into extraction column 9 containing the coffee. The gas stream containing the extracted caffein passes to the separator 10, equipped with heating coil 11, where it is vaporized. The vapor from separator 10 is cooled and recondensed in heat exchanger 12 and finally returned to pump 7. The function of water container 8 is to maintain the water content of the system, especially the water content of the carbon dioxide which may be appreciably decreased in the separator.

Depending upon such factors as the design of the apparatus, the flow volume, the flow rate of the solvent in the extraction column, the system pressure, the selected temperature and pressure, the water content of the beans and the solvent, the processing time to obtain a residual content of caffein in the beans of 0.02 to 0.08% dry substance is between 10 and 50 hours. The caffein content of the roasted coffee obtained from the extracted raw coffee is within the same range, and the content of water soluble substances is between 23 and 27%, depending upon the nature of the initial coffee blend.

The decisive advantage of the process of this invention is that even after 50 hours of processing time, it is not possible to distinguish the taste and aroma of the resulting product from that of the original. Additionally, it is not possible to distinguish the decaffeinated product from the original by visual inspection.

The following non-limiting examples are given by way of illustration only.

EXAMPLE I

In an installation according to FIG. 1, 3 kilograms of raw coffee with a moisture content of 50% were processed in a closed circuit for 14 hours at 20°C under a pressure of 350 atmospheres gauge with liquid, water saturated carbon dioxide. The water content of the charcoal in the adsorption tank was also 50%. After drying, the raw coffee as well as a roasted sample thereof were analyzed.

The results (the obtained values are given in column

EXAMPLE II

In an installation according to FIG. 1, 3 kilograms of raw coffee having an included moisture of 30% were treated in a closed circuit for 25 hours at 25°C and 90 atmospheres gauge with liquid water saturated carbon dioxide. The water content of the charcoal was also 30%.

Results, after drying and roasting:

|  | Caffein Content | | Water soluble Substances | | Moisture | |
| --- | --- | --- | --- | --- | --- | --- |
|  | A | B | A | B | A | B |
| Raw Coffee | 0.07% | 1.02% | 22.8% | 24.0% | 10% | 10.0% |
| Roasted Coffee | 0.08% | 1.11% | 24.5% | 25.7% | <1% | <1% |

EXAMPLE III

In an installation according to FIG. 2, 1 kilogram of raw coffee having a moisture content of 45% was treated in a closed circuit for 18 hours at 25°C and a pressure of 380 atmospheres gauge with liquid water-saturated carbon dioxide. The temperature in the separating container was maintained at 28°C, and the controlling $CO_2$ pressure was 70 atmospheres gauge.

After drying, and roasting:

|  | Caffein Content | | Water soluble Substances | | Moisture | |
| --- | --- | --- | --- | --- | --- | --- |
|  | A | B | A | B | A | B |
| Raw Coffee | 0.05% | 1.01% | 24.2% | 25.0% | 9.5% | 9.5% |
| Roasted Coffee | 0.07% | 1.09% | 26.8% | 27.6% | <1% | <1% |

Moist caffein was removed from the separating container after withdrawing the carbon dioxide, and showed a purity grade of greater than 98%.

What is claimed is:

1. A process for the decaffeination of raw coffee comprising moistening raw coffee to a moisture content of from about 10 to 60% extracting the raw coffee with liquid carbon dioxide at a pressure above the critical pressure of carbon dioxide and at a temperature wherein said carbon dioxide is maintained in a liquid state and below about 31.4°C.

2. A process according to claim 1 wherein the process is carried out at a pressure of from about 80 to 400 atmospheres.

3. A process according to claim 1 wherein the carbon dioxide is saturated with water.

4. Process according to claim 1 wherein prior to extraction the raw coffee is expanded by treatment with water or steam.

5. A process for recovering high purity caffein from raw coffee, comprising moistening raw coffee to a moisture content of from about 10 to 60%, extracting said coffee with liquid carbon dioxide maintained at a pressure of from about 80 to 400 atmospheres and a temperature of from about 0°C to about 31.4°C for a period of between about 10 and 50 hours, and separating the extracted caffein from the carbon dioxide.

6. Process according to claim 5, wherein the solvent media is conveyed in a closed circuit, and the separated caffein is adsorbed on a moist adsorption medium.

7. Process according to claim 5 wherein the caffein is separated from the liquid carbon dioxide by vaporization.

8. Process according to claim 7, wherein subsequent to vaporization the carbon dioxide is again liquified, and saturated with water before recycling to the extraction container.

* * * * *